US008761731B2

(12) United States Patent
Davidson et al.

(10) Patent No.: US 8,761,731 B2
(45) Date of Patent: Jun. 24, 2014

(54) METHOD AND APPARATUS FOR PROVIDING MOBILE DEVICE INFORMATION THROUGH A COMPUTING DEVICE

(75) Inventors: Ford Davidson, Bellevue, WA (US); James P. Prudente, Seattle, WA (US); Hayes Haugen, Seattle, WA (US)

(73) Assignee: Dashwire Incorporation, Belleuve, WA (US)

( * ) Notice: Subject to any disclaimer, the term of this patent is extended or adjusted under 35 U.S.C. 154(b) by 1250 days.

(21) Appl. No.: 11/869,563

(22) Filed: Oct. 9, 2007

(65) Prior Publication Data

US 2008/0085731 A1    Apr. 10, 2008

Related U.S. Application Data

(60) Provisional application No. 60/828,919, filed on Oct. 10, 2006.

(51) Int. Cl.
*H04L 12/58* (2006.01)

(52) U.S. Cl.
USPC ............. 455/412.1; 455/414.1; 455/517; 370/352

(58) Field of Classification Search
USPC ............. 370/352; 455/412.1, 414.1, 517
See application file for complete search history.

(56) References Cited

U.S. PATENT DOCUMENTS

| | | | | |
|---|---|---|---|---|
| 5,915,225 A * | 6/1999 | Mills | ............................. | 455/558 |
| 7,299,037 B2 * | 11/2007 | Hospes | ......................... | 455/419 |
| 7,636,426 B2 * | 12/2009 | Korah et al. | ............... | 379/88.14 |
| 2002/0136226 A1 | 9/2002 | Christoffel et al. | | |
| 2004/0204085 A1 | 10/2004 | Vargas et al. | | |
| 2005/0138211 A1 * | 6/2005 | Cheng | ........................... | 709/250 |
| 2006/0027648 A1 * | 2/2006 | Cheah | ......................... | 235/381 |
| 2006/0041686 A1 | 2/2006 | Caspi et al. | | |
| 2006/0129632 A1 | 6/2006 | Blume et al. | | |
| 2006/0148500 A1 * | 7/2006 | Glenner et al. | ............. | 455/517 |
| 2006/0189348 A1 * | 8/2006 | Montulli et al. | .......... | 455/556.1 |
| 2006/0217111 A1 * | 9/2006 | Marolia et al. | ................ | 455/418 |
| 2006/0229066 A1 * | 10/2006 | Rodriguez et al. | ............ | 455/420 |
| 2006/0246915 A1 * | 11/2006 | Shrivastava | ................... | 455/445 |
| 2007/0077924 A1 * | 4/2007 | Bhogal et al. | ................ | 455/420 |
| 2007/0087736 A1 * | 4/2007 | Wilson et al. | ................ | 455/418 |
| 2007/0190995 A1 * | 8/2007 | Wang et al. | .................. | 455/419 |
| 2007/0197203 A1 * | 8/2007 | Hu | ................................ | 455/419 |
| 2009/0181654 A1 * | 7/2009 | Koch et al. | ................. | 455/414.1 |

OTHER PUBLICATIONS

International Search Report for PCT/US2007/81004 dated Apr. 3, 2008 (3 pages).
Written Opinion of International Searching Authority for PCT/US2007/81004n dated Apr. 3, 2008 (5 pages).

* cited by examiner

*Primary Examiner* — Kashif Siddiqui
*Assistant Examiner* — Shahriar Behnamian
(74) *Attorney, Agent, or Firm* — Schwabe, Williamson & Wyatt, P.C.

(57) ABSTRACT

Methods and apparatuses for a service system capable of providing, to a computing device, mobile device information received from a mobile device, the mobile device being associated with a user of the computing device, are described herein. In one embodiment, the mobile device, service system, and computing device may each be separate and distinct from the others. In various embodiments, the client device may facilitate a user in viewing and/or interacting with the provided mobile device information.

18 Claims, 5 Drawing Sheets

METHOD AND APPARATUS FOR PROVIDING MOBILE DEVICE INFORMATION THROUGH A COMPUTING DEVICE

RELATED APPLICATIONS

The present application claims priority to U.S. Provisional Application 60/828,919, entitled "Mobile Phone Interacting Method and Apparatus", filed on Oct. 10, 2006. The specifications of the 60/828,919 provisional application is hereby fully incorporated by reference.

TECHNICAL FIELD

Embodiments of the present invention relate generally to mobile devices and services. More specifically, the embodiments relate to a service for providing access to and interaction with mobile device information from a computing device.

BACKGROUND

Wireless phones have a variety of functionalities that customers can interact with. Such functionalities include making phone calls, sending messages, accessing call history, browsing network content, and taking and viewing photos and videos. On some smartphone devices (mini-PCs in the form of a phone), there are thousands of applications and services that enable new functionalities.

Wireless phones are typically designed for mobile usage, and therefore have a small form factor, including small display screens, small keypads, typically access to only one function at a time, and so forth.

Many phones today are capable of syncing with a PC and/or server to transfer personal information management (PIM) content (email, calendar, contacts, tasks) and, in some cases, photos and music while connected via USB or wireless connection for storage on the PC.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Illustrative embodiments of the present invention include, but are not limited to, methods and apparatuses for a service system capable of providing, to a computing device, mobile device information received from a mobile device, the mobile device being associated with a user of the computing device. In some embodiments, the mobile device, service system, and computing device may each be separate and distinct from the others. The service system may also receive an indication, from the computing device, of a user interaction. In response, the service system may update the mobile device information, perform an action on behalf of the mobile device, or direct the mobile device to perform the action. In various embodiments, the client device may facilitate a user in viewing and/or interacting with the provided mobile device information. The client device may further receive one or more user interactions and provide service system with an indication of the interaction(s).

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
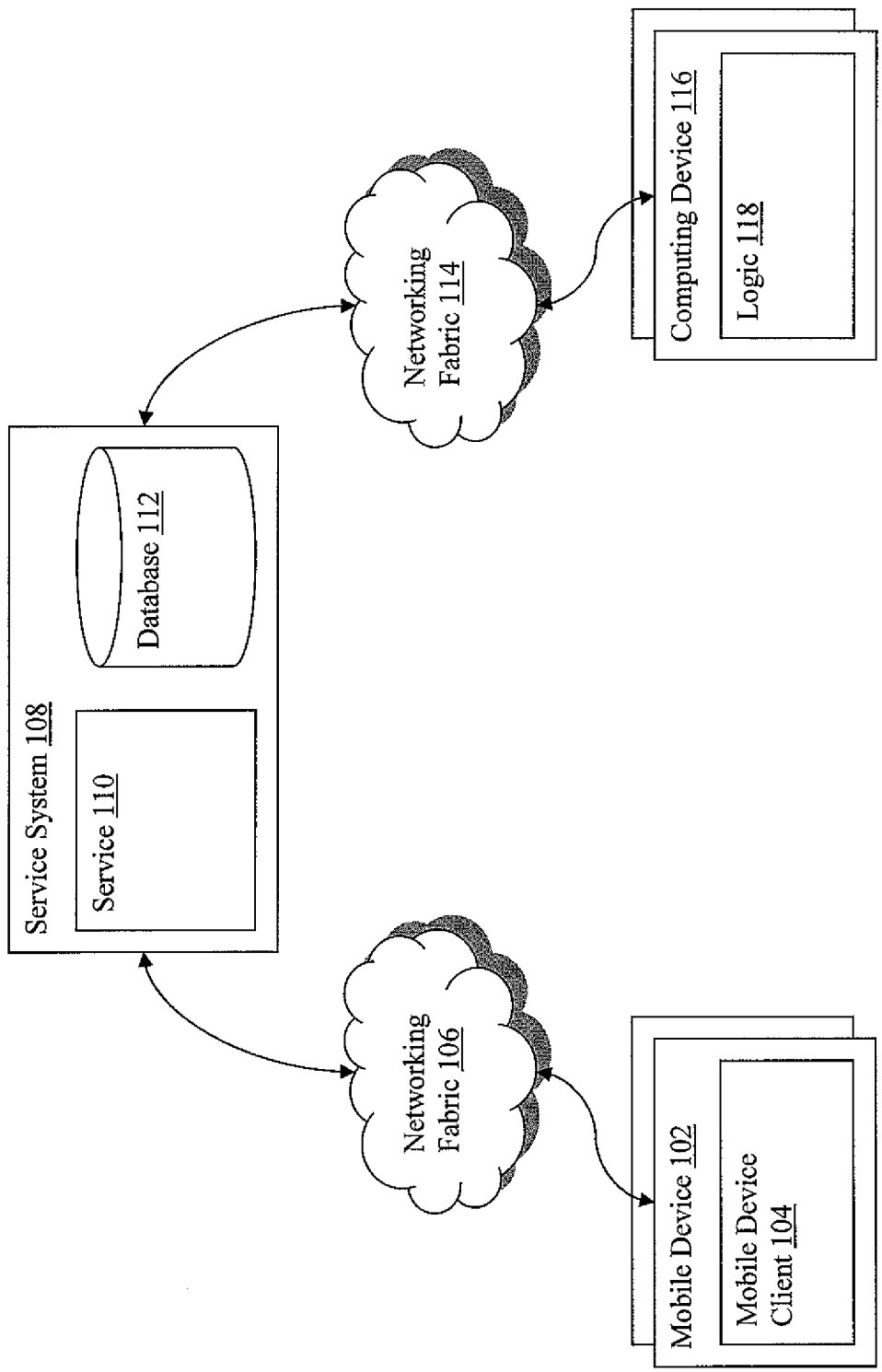
FIG. 1 is an overview of various embodiments of the present invention.

FIG. 1 illustrates an overview of various embodiments of the present invention. As illustrated, service system 108 may include a service 110 and a database 112. In some embodiments, service system 108 may comprise one or more computing devices, each having at least a portion of service 110 and/or database 112. Service 110 may be capable of providing mobile device clients 104 to a plurality of mobile devices 102 via networking fabric 106. In various embodiments, the mobile device clients 104 may be capable of providing mobile device information of mobile devices 102 to service 110 and of receiving, in return, notification of updates to the mobile device information or of the performance of any actions by service 110 on behalf of mobile devices 102. In one embodiment, mobile device client 104 may receive a directive from service 110 to perform an action.

In various embodiments, the updates and actions may be the result of interactions with the mobile device information by a user of computing device 116. As shown, service 110 may provide the received mobile device information to computing device 116 via networking fabric 114 to enable a user of computing device 116 to view and/or interact with the mobile device information. In one embodiment, the user may be associated with a mobile device 102 and service 110 may require authentication of the user before providing the mobile device information of the user-associated mobile device 102. Service 110 may then receive one or more indications of user interaction with the mobile device information from computing device 116. In response, service 110 may update the mobile device information, perform an action on behalf of the mobile device 102, or direct the mobile device 102 to perform the action. In various embodiments, networking fabric 114 may be the same, in totality or in part, as networking fabric 106.

In some embodiments, computing device 116 may include logic 118 capable of receiving the mobile device information, facilitating the user in viewing and/or interacting with the information, receiving one or more user interactions, and providing an indication of the interaction(s) to service 110. In one embodiment, logic 118 may be a plug-in to a browser application of computing device 116.

As illustrated, mobile devices 102 may be any sort of mobile devices known in the art, except for mobile device client 104. Mobile devices 102 may be wireless mobile phones, personal digital assistants (PDA), palm computers, or media players. Such mobile devices 102 may have a small form factor and a reduced set of inputs, in some embodiments. Also, mobile devices 102 may have one or more wired, wireless, infrared, etc. networking interfaces to facilitate communication with service system 108 via networking fabric 106. In other words, networking fabric 106 may comprise a wired, wireless or infrared based access point, and the fabric may comprise wired, wireless and/or infrared segments/domains.

As mention above, each mobile device 102 may include or receive mobile device client 104, which may be any single- or multi-threaded client application. Mobile device clients 104 may be received from service 110 via networking fabric 106 or may come installed with other applications of mobile device 102. In some embodiments, mobile device client 104 may be provided in response to a mobile device 102 user registering for a service. In one embodiment, mobile device client 104 may include an application programming interface (API) with a plurality of functions callable by service 110. Mobile device client 104 may also include logic to periodically provide mobile device information, such as emails, messages, a call history, photos, music, videos, a calendar, and mobile device settings, to service 110. In one embodiment, logic of mobile device client 104 may monitor for changes to mobile device information, such as a new email sent by mobile device 102, and may provide in response updated mobile device information to service 110. Also, in such an embodiment, the logic may simply provide information indicate of the changes, such as the adding of a new contact, rather than re-providing all mobile device information each time any part of it is updated. In some embodiments, mobile device client 104 may provide the mobile device information in real time or in batches.

In various embodiments, the API of mobile device client 104 may be configured to hook into native APIs of mobile device 102. For example, the API of mobile device client 104 may include a callable function capable of causing a text message to be sent. That callable function may in turn call an API function of a native text messaging application of mobile device 102. Also, the API of mobile device client 104 may comprise modules corresponding to native applications and/ or features of mobile device 102, such as Short Message Service (SMS)/Multimedia Messaging Service (MMS) messages, calls, photos, videos, contacts, files, events, voicemail, lists, ring tones, themes, speed dial, alarm clock, music, phone settings, battery life, and third party components, among many others. In some embodiments, service 110 may direct mobile device 102 to perform an action by calling a function of the API of mobile device client 104. Such actions may include initiating a call, such as a Voice over IP (VoIP) call, sending an email, posting a photo or video for sharing, sending a text message, or changing a mobile device setting. In further embodiments, service 110 may also notify mobile device client 104 that the mobile device information has been updated or that service 110 has performed an action on behalf of mobile device 102, and such notification may be provided by calling a function of the API of mobile device client 104.

In some embodiments, service 110 may store a variety of mobile device clients 104, each mobile device client 104 customized for a different mobile device 102 platform. For example, mobile device client 104 may be customized for a Windows mobile platform, a Symbian platform, a J2ME platform, a BREW platform, or a Linux platform, among many others.

Figure 5:
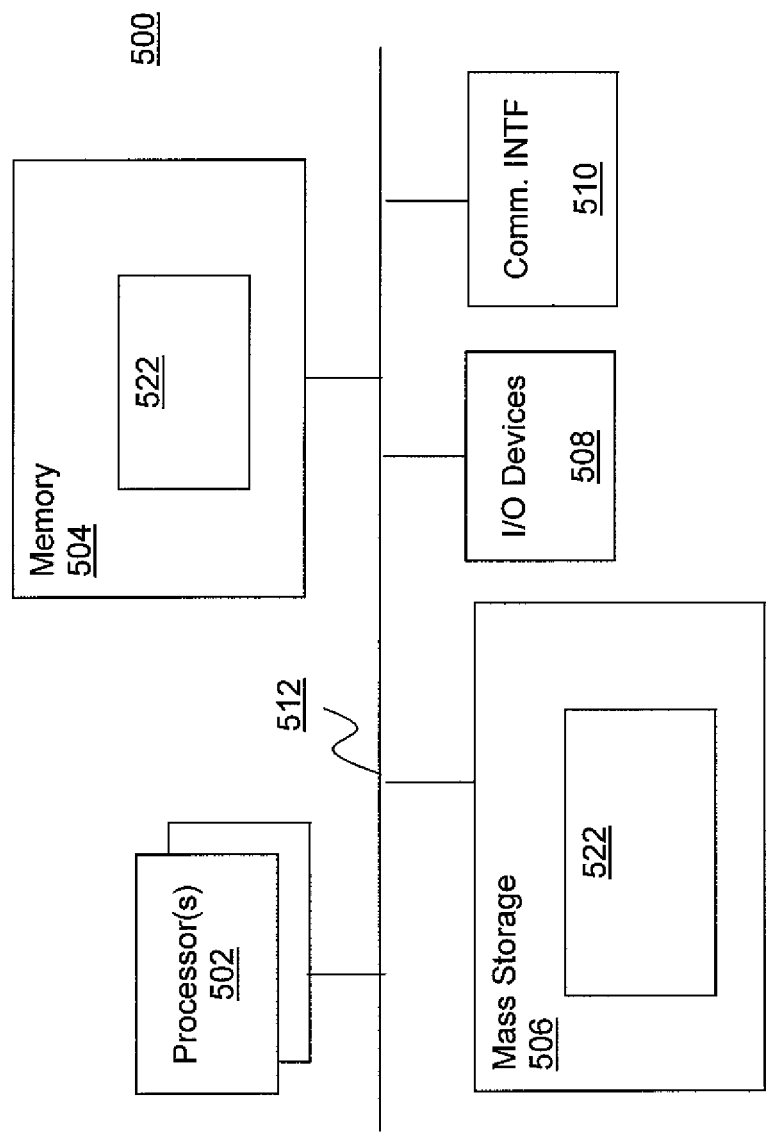
FIG. 5 illustrates an example computer system suitable for use to practice service system and/or computing device aspects of various embodiments of the present invention.

As illustrated, service system 108 may include one or more of any single- or multi-processor or processor core central processing unit (CPU) computing system, and computing device 116 may be any single- or multi-processor or processor core central processing unit (CPU) computing system. Service System 108 may include and computing device 116 may be a personal computer (PC), a workstation, a server, a router, a mainframe, a modular computer within a blade server or high-density server, a personal digital assistant (PDA), an entertainment center, a set-top box, or a mobile device. Also, each computer system of service system 108 and computing device 116 may each be capable of operating a plurality of operating systems (OS) in a plurality of virtual machines (VM) using virtualization technologies. An exemplary single-/multi-processor or processor core computing system of each of service system 108 and computing device 116 is illustrated by FIG. 5, and is described in greater detail below. Hereinafter, including in the claims, processor and processor core shall be used interchangeable, with each term including the other.

As is further shown, mobile devices 102 and service system 108 may be connected by a networking fabric 106, and service system 108 and computing device 116 may be connected by a networking fabric 114. In one embodiment, networking fabric 106 and networking fabric 114, as described earlier, may be the same, partially the same, or a different networking fabric. Networking fabric 106 and networking fabric 114 may each be any sort of networking fabric known in the art, such as one or more of a local area network (LAN), a wide area network (WAN), a Wi-Fi network, a personal area network (PAN), and the Internet. In various embodiments, one or both of networking fabrics 106 and 114 may comprise private network(s) of enterprise(s). The parties to the connections, here mobile devices 102, service system 108, and computing devices 116, may further use any communication protocol known in the art, such as the Hypertext Transfer Protocol (HTTP), and any transport protocol known in the art, such as the Transmission Control Protocol/Internet Protocol (TCP/IP) suite of protocols. As mentioned, each of mobile devices 102, service system 108, and computing devices 116 may have at least one networking interface to facilitate networked communication across either or both of networking fabric 106 and 114.

As illustrated and described above, service system 108 may include service 110, which may be any single- or multi-threaded service application and may be capable of simultaneously serving multiple mobile devices 102 and computing devices 116. In some embodiments, service 110 may comprise a plurality of servers, such as one or more web servers, a push server for providing notifications/updates, a proxy server for receiving mobile device information and notifications, and one or more application servers, such as a messaging server, to perform actions on behalf of mobile devices 102.

In various embodiments, service 110 may facilitate users having mobile devices 102 in registering for services provided by service system 108 through service 110. Service 110 may ask users for a login name and a password, as well as other information useful for authentication, and may store the information in database 112. Service 110 may also ask users for information regarding mobile devices 102. In some embodiments, mobile devices 102 may have come with mobile device clients 104 preinstalled, and service 110 may use the phone information received from the user to recognize and/or activate the mobile devices 102. In other embodiments, upon registering and providing phone information, service 110 may provide a mobile device client 104 to the mobile device 102 corresponding to the phone information. In such embodiments, the mobile device client 104 may be provided to the mobile device 102 via the networking fabric 106. And as mentioned above, mobile device client 104 may be targeted for mobile device 102's platform.

As mentioned above, service 110 may automatically receive mobile device information from mobile device clients 104, either in real time or in batches reflecting changes or additions to mobile device information. Upon receiving mobile device information from a mobile device client 104, service 110 may store the information in database 112.

In various embodiments, when a registered user desires to view and/or interact with mobile device information of the user's mobile device 102, the user may authenticate with service 110, which may require authentication before providing mobile device information. Service 110 may present an authentication web page to a user browsing on a computing device 116 to facilitate the user in authenticating. The web page may include, for example, text input fields for a login name and a password, as well as a submit button. Service 110 may then receive a login name and password submitted by the user and may compare that information to a login name and password stored in database 112. If the comparison does not indicate a match, service 110 may notify the user of an authentication failure.

If the comparison does indicate a match, however, service 110 may proceed and provide a customized web page or other display including the mobile device information to the computing device 116 of the authenticated user. In some embodiments, the customized web page or other display may provide the mobile device information in a format comprehensible by logic 118 or a browser application of the computing device 116 to enable the computing device 116 to display the mobile device information to the user for the user to view and/or interact with. For example, the provided web page/displayed may be a Hypertext Markup Language (HTML), an Extensible Markup Language (XML), and/or a JavaScript document.

In various embodiments, service 110 may receive from computing device 116 an indication of one or more user interactions with the provided mobile device information. The indication may also comprise an HTML or XML document, but may have any format known in the art. Further, the interactions conveyed by the indication may be one or more of an update to the mobile device information or a request for the performance of an action by or on behalf of mobile device 102.

If the interaction(s) include an update to the mobile device information, such as a change of a phone setting or a new contact, service 110 may store the updated mobile device information in database 112 and notify mobile device 102 of the update, in one embodiment by calling functions of the above-described mobile device client 104 API. If the interaction(s) include a request for the performance of an action by or on behalf of mobile device 102, service 110 may either perform the action on behalf of mobile device 102 or may direct mobile device 102 to perform the action. In one embodiment, service 110 may direct mobile device 102 to perform the action, if mobile device 102 is reachable via networking fabric 106, or may perform the action itself on behalf of mobile device 102 if mobile device 102 is unreachable. In such embodiments, service 110 may direct mobile device 102 to perform the action by calling functions of the mobile device client API, as described above. Service 110 may perform the action on behalf of mobile device 102 via application servers of service 110. For example, if the action is the sending of a text message, service 110 may send the text message via a messaging application server of service 110. Service 110 may then notify mobile device 102 of the performance of the action on its behalf by calling a function of the mobile device client 104 API, in one embodiment causing the mobile device 102 to believe that mobile device 102, rather than service 110, performed the action.

As is shown, service system 108 may include database 112, and database 112 may be any sort of database known in the art, except for its internal structuring (e.g., tables) and data. Database 112 may be a relational database, a normalized database, a de-normalized database, or a file. In various embodiments, database 112 may store versions of mobile device client 104 targeted to a number of mobile device platforms, as described above. Database 112 may further store mobile device information for each mobile device 102 as well as associated authentication information, such as a login name and a password, which may be used by service 110 to authenticate users of computing devices 116.

In various embodiments, as mentioned above, a computing device 116 may include logic 118. Logic 118 may comprise any sort of single- or multi-thread application and, as mentioned above, may be implemented as a plug-in to a computing device 116 browser, such as a plug-in to a Mozilla Firefox browser, or as Active-X component(s). In other embodiments, logic 118 may instead be implemented as a separate, stand-alone program invocable by a user. In yet other embodiments, computing device 116 may not include logic 118, and the browser application may serve as the point of interaction between service 110 and the user.

Figure 4:
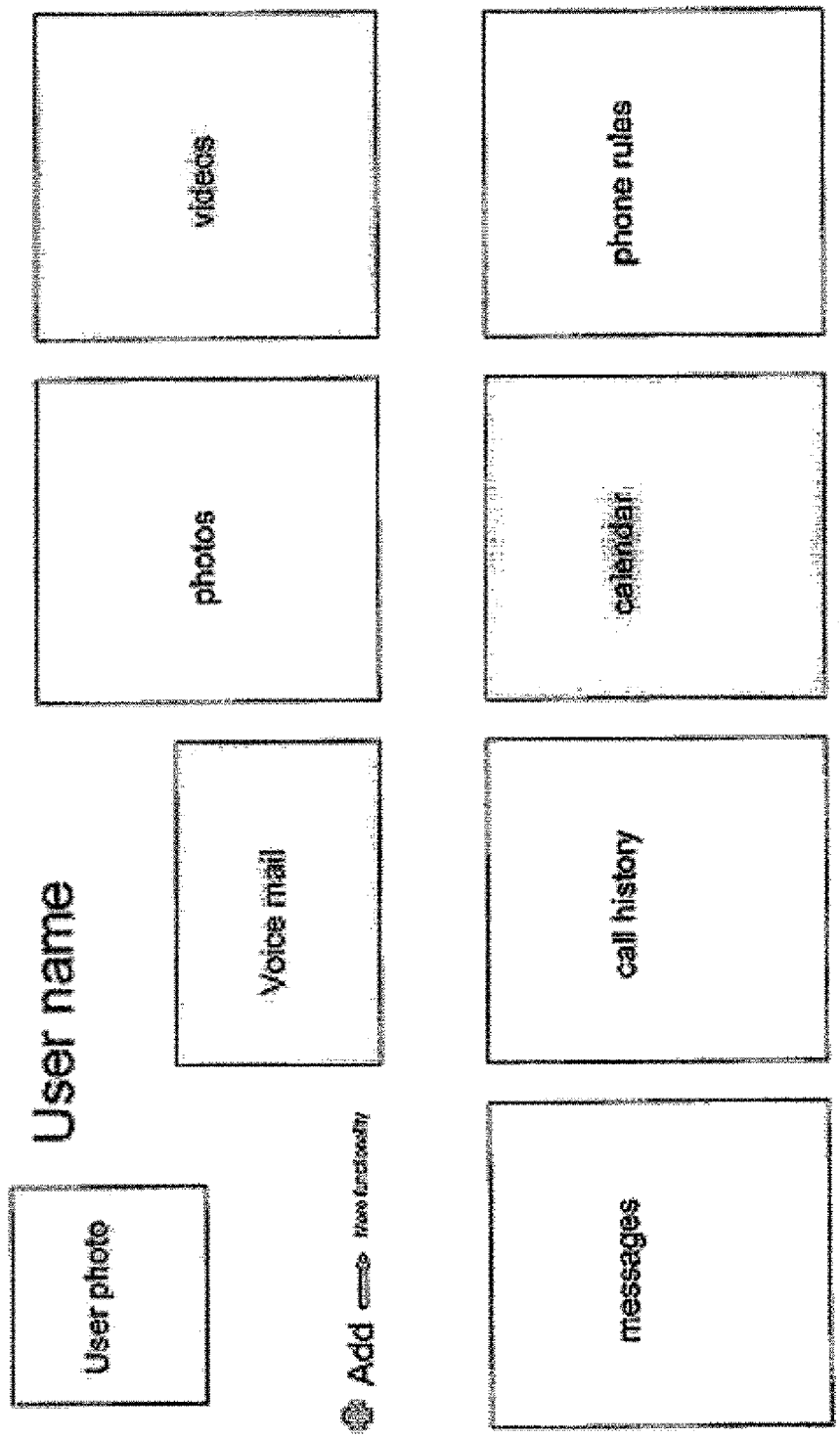
FIG. 4 illustrates an exemplary display of computing device in accordance with various embodiments of the invention.

In some embodiments, computing device 116 may facilitate a user in authenticating with service 110, as described above in greater detail. Upon authentication of the user, computing device 116 may receive mobile device information and may, in response, render a visual display of the mobile device information. Such an exemplary display is illustrated by FIG. 4 and is described in greater detail below. As shown in FIG. 4, the display may comprise a dashboard like layout having regions of the display associated with categories of mobile device information. Each region may comprise a content and/or functionality module. In one embodiment, the regions/modules may be added, removed, or rearranged by the user. In some embodiments, modules for viewing, managing, and using one or more of SMS/MMS messages, calls, photos, videos, contacts, files, events, voicemail, lists, ring tones, themes, speed dial, alarm clock, music, phone settings/rules, battery life, and/or third party components may be included in the rendered display. The modules may also include a system module for handling communication with service 110. In some embodiments, the rendered display may differ from that provided by mobile device 102.

In various embodiments, the modules may facilitate the user in viewing and interacting with the rendered mobile device information. For example, the modules may facilitate the user in viewing SMS/MMS inbox content, sending responses or create new SMS/MMS messages, saving mobile device 102 sent or received messages locally to computing device 102, viewing call history, making VoIP calls, seeing photos and videos taken by mobile device 102, posting photos and videos to sharing sites, and setting rules/preferences/settings of mobile device 102. To provide facilities for such interactions, the modules may include form elements and other graphic elements capable of receiving and registering user input(s). In other embodiments, one or more of the modules may simply display mobile device information and may provide a control whose actuation results in the opening of a new input display window. Upon receiving and registering user interaction(s), logic 118 may provide an indication of the interactions to service 110.

In some embodiments, users who communicate with one another via call or message and who also use service 110 have the option to have information presented to their contacts automatically, like what kind of phone they have, how they have personalized it thru service 110, what type of phones their friends are using, new media they have captured, and purchases they have made. Users may effectuate this option through one or more settings of mobile device 102 associated with the automatic presentation of information to contacts.

Figure 2:
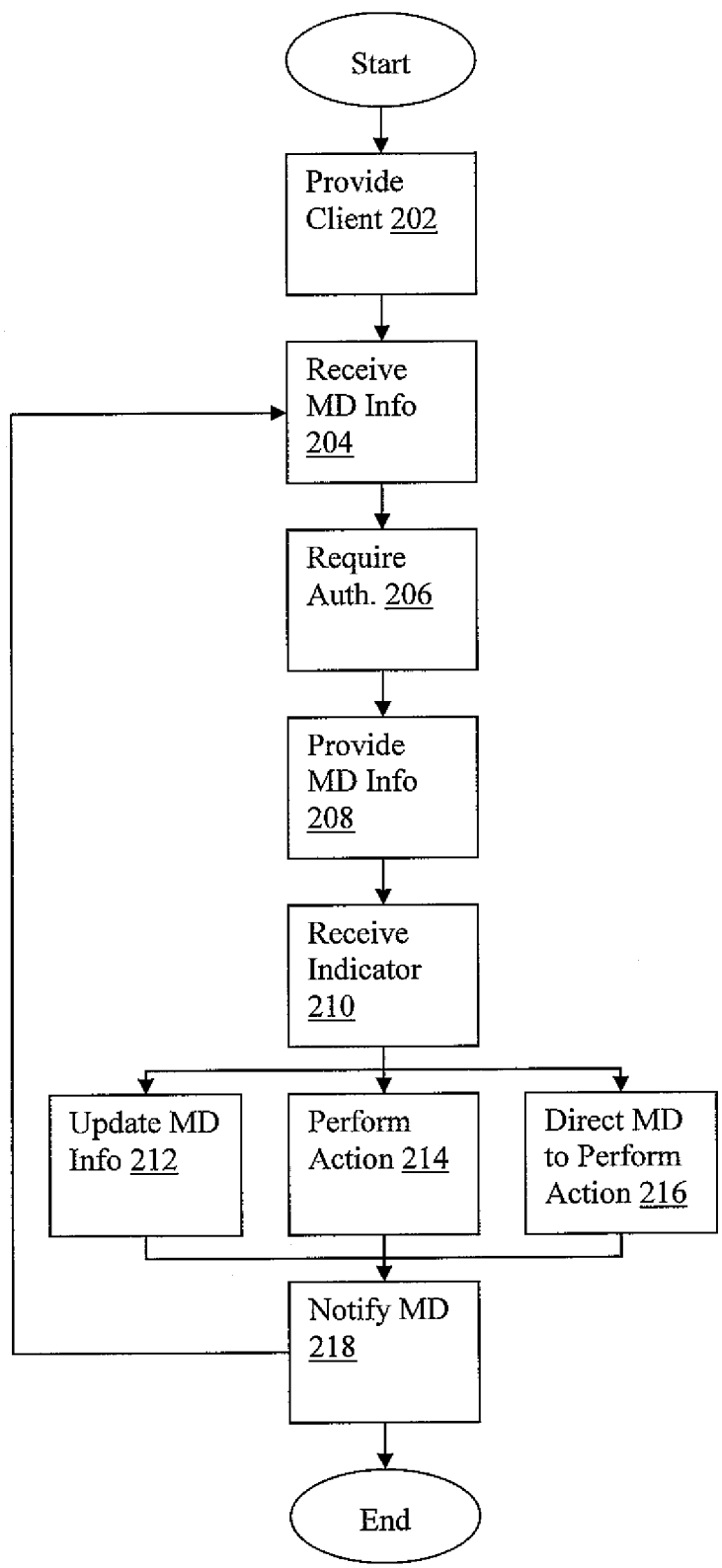
FIG. 2 illustrates a flow chart view of selected service system operations of the methods of various embodiments of the present invention.

FIG. 2 illustrates a flow chart view of selected service system operations of the methods of various embodiments of the present invention. As illustrated, a service system may provide a mobile device client to a mobile device to facilitate the mobile device in providing mobile device information of the mobile device to the service system, block 202. The service system and mobile device may be separate and distinct from each other. In one embodiment, the mobile device information includes at least one of emails, messages, a call history, photos, music, videos, a calendar, and mobile device settings. Subsequently, the service system may receive the mobile device information from the mobile device, block 204.

In various embodiments, the service system may then require authentication of a user of a computing device before providing the mobile device information to the computing device, block 206. The service system and computing device may be separate and distinct from each other. And in some embodiments, the user may be associated with the mobile device. Upon receiving authentication, the service system may provide the mobile device information to the computing device to facilitate the user in viewing and/or interacting with the mobile device information, block 208.

As is further shown, the service system may then receive from the computing device an indication of one or more user interactions with the mobile device information, block 210. In response, the service system may update the mobile device information, block 212, perform an action on behalf of the mobile device, block 214, or direct the mobile device to perform the action, block 216. In one embodiment, the action is one or more of initiating a Voice over IP (VoIP) call, sending an email, posting a photo or video for sharing, sending a text message, or changing a mobile device setting. In some embodiments, the service system may then notify the mobile device of the updated mobile device information or the performed action, block 218. The service system may then receive, in response, updated mobile device information from the mobile device, block 204.

Figure 3:
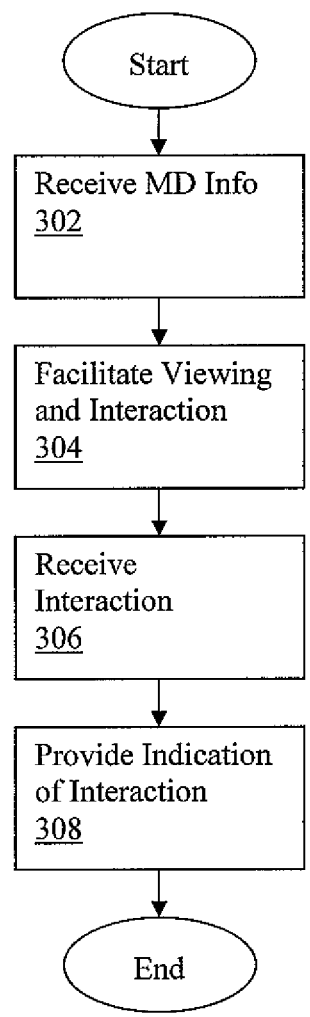
FIG. 3 illustrates a flow chart view of selected computing device operations of the methods of various embodiments of the present invention.

FIG. 3 illustrates a flow chart view of selected computing device operations of the methods of various embodiments of the present invention. As illustrated, a computing device may receive mobile device information from a service system, block 302, the mobile device information having been provided to the service system by a mobile device associated with a user of the computing device, the mobile device, service system, and computing device each being separate and distinct from the others. In one embodiment, the mobile device information may include at least one of emails, messages, a call history, photos, music, videos, a calendar, and mobile device settings. The computing device may then facilitate the user in viewing and/or interacting with the mobile device information, block 304. In one embodiment, the facilitating may include providing a user interface having icons/glyphs associated with modules for handling different categories of the mobile device information. In various embodiments, the computing device may then receive one or more user interactions with the mobile device information, block 306, and, in response, may provide an indication of the one or more interactions to the server system, block 308. In one embodiment, at least one of the receiving, the facilitating, the receiving, and the providing is performed by a plug-in to a browser of the computing device.

FIG. 4 illustrates an exemplary display of a computing device in accordance with various embodiments of the invention. As illustrated, a display of a computing device may present to a user a plurality of icons or glyphs corresponding to categories of mobile device information, such as a user photo, voice mail, photos, videos, messages, call history, a calendar, and phone rules/settings, among others. Each icon/glyph may occupy a specific region of the display, or may be added and removed from the display in response to user interactions. As described above in greater detail with regard to FIG. 1, each icon/glyph may be associated with one or more modules configured to cooperate with each other to convey mobile device information for viewing by the user, and may also be configured to include mechanisms to facilitate user interaction, such as editable text boxes, various form controls, and graphic buttons or keys whose actuation may result in the creation of a new window, such as a text message window. The exemplary display is provided simply for the sake of illustration. The categories of information and their visual configuration may vary from embodiment to embodiment.

FIG. 5 illustrates an example computer system suitable for use to practice service system and/or computing device aspects of various embodiments of the present invention. As shown, computing system 500 includes a number of processors or processor cores 502, and system memory 504. For the purpose of this application, including the claims, the terms "processor" and "processor cores" may be considered synonymous, unless the context clearly requires otherwise. Additionally, computing system 500 includes mass storage devices 506 (such as diskette, hard drive, compact disc read only memory (CDROM) and so forth), input/output devices 508 (such as display, keyboard, cursor control and so forth) and communication interfaces 510 (such as network interface cards, modems and so forth). The elements are coupled to each other via system bus 512, which represents one or more buses. In the case of multiple buses, they are bridged by one or more bus bridges (not shown).

Each of these elements performs its conventional functions known in the art. In particular, system memory 504 and mass storage 506 may be employed to store a working copy and a permanent copy of the programming instructions implementing at least a portion of one of the various components, such as service 110 or logic 118, herein collectively denoted as 522. The various components may be implemented by assembler instructions supported by processor(s) 502 or high-level languages, such as, for example, C, that can be compiled into such instructions.

The permanent copy of the programming instructions may be placed into permanent storage 506 in the factory, or in the field, through, for example, a distribution medium (not shown), such as a compact disc (CD), or through communication interface 510 (from a distribution server (not shown)). That is, one or more distribution media having an implementation of the agent program may be employed to distribute the agent and program various computing devices.

The constitution of these elements 502-512 are known, and accordingly will not be further described.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present invention. This application is intended to cover any adaptations or variations of the embodiments discussed herein. Therefore, it is manifestly intended that the embodiments of the present invention be limited only by the claims and the equivalents thereof.

What is claimed is:

1. A method comprising:
receiving, by a service system, from a mobile device, mobile device information of the mobile device, wherein the mobile device information was sent to the service system in response to the mobile device information being changed on the mobile device, wherein the mobile device information was sent to enable a user of the mobile device to view or interact with the mobile device information using a computing device, and to perform an action towards another computing device on behalf of the mobile device, through interaction with the mobile device information, using the computing device and the service system, and wherein the mobile device, the service system, the computing device, and the other computing device are separate and distinct from each other;
providing, by the service system, the mobile device information to the computing device, for the user to view or interact with the mobile device information;
receiving from the computing device, by the service system, an indication of one or more user interactions with the mobile device information; and
performing on behalf of the mobile device, by the service system, in response to receipt of the indication from the computing device, an action towards the other computing device, based at least in part on the received indication of one or more user interactions.

2. The method of claim 1, wherein the mobile device information includes at least one of emails, messages, a call history, photos, music, videos, a calendar, and mobile device settings.

3. The method of claim 1, further comprising requiring, by the service system, authentication of the user before performing said providing.

4. The method of claim 1, wherein the action is one or more of initiating a Voice over IP (VoIP) call, sending an email, posting a photo or video for sharing, or sending a text message, on behalf of the mobile device.

5. The method of claim 1, further comprising, in response, updating, by the service system, the mobile device information on the mobile device, or directing, by the service system, the mobile device to perform an action.

6. The method of claim 5, wherein the action further includes one or more of initiating a VoIP call, sending an email, posting a photo or video for sharing, sending a text message, or changing a mobile device setting.

7. The method of claim 1, further comprising providing, by the service system, a mobile device client to the mobile device to facilitate the mobile device in providing the mobile device information to the service system.

8. A service system comprising:
one or more processors; and
a service to be operated by the one or more processors to:
provide, to a computing device, mobile device information of a mobile device for a user to view or interact with the mobile device information, wherein the mobile device information is provided to the service system, from the mobile device, in response to the mobile device information being changed on the mobile device, wherein the mobile device information was sent to enable the user of a mobile device to view or interact with the mobile device information using a computing device, and to perform an action towards another computing device on behalf of the mobile device, through interaction with the mobile device information, using the computing device and the service system, and wherein the mobile device, the service system, the computing device, and the other computing device are separate and distinct from each other;
receive, from the computing device, an indication of one or more user interactions with the mobile device information; and
in response to receipt of the indication from the computing device of one or more user interactions, perform an action towards the other computing device by the service system on behalf of the mobile device.

9. The service system of claim 8, wherein the mobile device information includes at least one of emails, messages, a call history, photos, music, videos, a calendar, and mobile device settings.

10. The service system of claim 8, wherein the service is further to be operated to require authentication of the user before performing said provide.

11. The service system of claim 8, wherein the service is further to be operated to notify the mobile device of the performed action.

12. The service system of claim 8, wherein the action includes one or more of initiating a Voice over IP (VoIP) call, sending an email, posting a photo or video for sharing, or sending a text message.

13. The service system of claim 8, wherein the service is further to be operated to direct the mobile device to perform an action including one or more of initiating a Voice over IP (VoIP) call, sending an email, posting a photo or video for sharing, sending a text message, or changing a mobile device setting.

14. The service system of claim 8, wherein the service is further to provide a mobile device client to the mobile device to facilitate the mobile device in providing the mobile device information to the service system.

15. A method comprising:
receiving, by a computing device, from a service system, mobile device information of a mobile device, wherein the mobile device information was provided to the service system, from the mobile device, in response to the mobile device information being changed on the mobile device, wherein the mobile device information was sent to enable a user of the mobile device to view or interact with the mobile device information using the computing device, and to perform an action towards another computing device on behalf of the mobile device, through interaction with the mobile device information, using the computing device and the service system, and wherein the mobile device, the service system, the computing device, and the other computing device are separate and distinct from each other;

facilitating, by the computing device, for the user to view or interact with the mobile device information;

receiving, by the computing device, one or more user interactions with the mobile device information; and in response to, providing, by the computing device, receipt of an indication of the one or more interactions to the service system for the service system to perform an action towards the other computing device by the service system on behalf of the mobile device.

16. The method of claim 15, wherein at least one of said receiving, said facilitating, said receiving, and said providing is performed by a plug-in to a browser of the computing device.

17. The method of claim 15, wherein the mobile device information includes at least one of emails, messages, a call history, photos, music, videos, a calendar, and mobile device settings.

18. The method of claim 15, wherein the facilitating includes providing, by the computing device, a user interface having icons/glyphs associated with modules for handling different categories of the mobile device information.

\* \* \* \* \*